(12) United States Patent
Sullivan et al.

(10) Patent No.: US 7,963,190 B2
(45) Date of Patent: Jun. 21, 2011

(54) HELICAL GEAR SETS

(75) Inventors: Michael Sullivan, Solvay, NY (US);
Richard Mizon, Fayetteville, NY (US);
John Desilvia, Jordan, NY (US); Burke Smith, Syracuse, NY (US); Timothy Breen, East Syracuse, NY (US); Brian Ide, Syracuse, NY (US)

(73) Assignee: Harrier Technologies, Inc., Greenwich, CT (US)

( * ) Notice: Subject to any disclaimer, the term of this patent is extended or adjusted under 35 U.S.C. 154(b) by 389 days.

(21) Appl. No.: 12/283,581

(22) Filed: Sep. 15, 2008

(65) Prior Publication Data

US 2010/0064832 A1    Mar. 18, 2010

(51) Int. Cl.
*F16H 33/00* (2006.01)
(52) U.S. Cl. ........................................... 74/640
(58) Field of Classification Search ............ 74/640, 74/665 B, 332, 414, 410, 325, 331, 412 R, 74/413, 458; 464/182
See application file for complete search history.

(56) References Cited

U.S. PATENT DOCUMENTS

| | | | |
|---|---|---|---|
| 4,242,920 A * | 1/1981 | Sigg | 74/361 |
| 7,076,875 B2 * | 7/2006 | Puetz et al. | 29/893.35 |
| 2006/0048601 A1 * | 3/2006 | Chiao | 74/640 |

* cited by examiner

*Primary Examiner* — David D Le
*Assistant Examiner* — David J Hlavka
(74) *Attorney, Agent, or Firm* — Dennis B. Haase

(57) ABSTRACT

A gear set for a transmission for use in limited space and capable of transmitting relatively large amounts of power with a small diameter of the gear sets, comprising a series of helical gear elements having stub shafts extending laterally from either side thereof, each of the stub shafts having teeth formed at the remote ends thereof and a central axial bore extending through each gear element and a coupler adapted to engage the teeth on adjacent gear elements join gear elements in driving contact. The gear set having a relatively large effective diameter, and a tension rail extending through the axial bore in the gear elements with retainers at either end of the tension rail so as to effectively permit limited axial movement along the tension rail while preventing inadvertent disengagement.

15 Claims, 2 Drawing Sheets

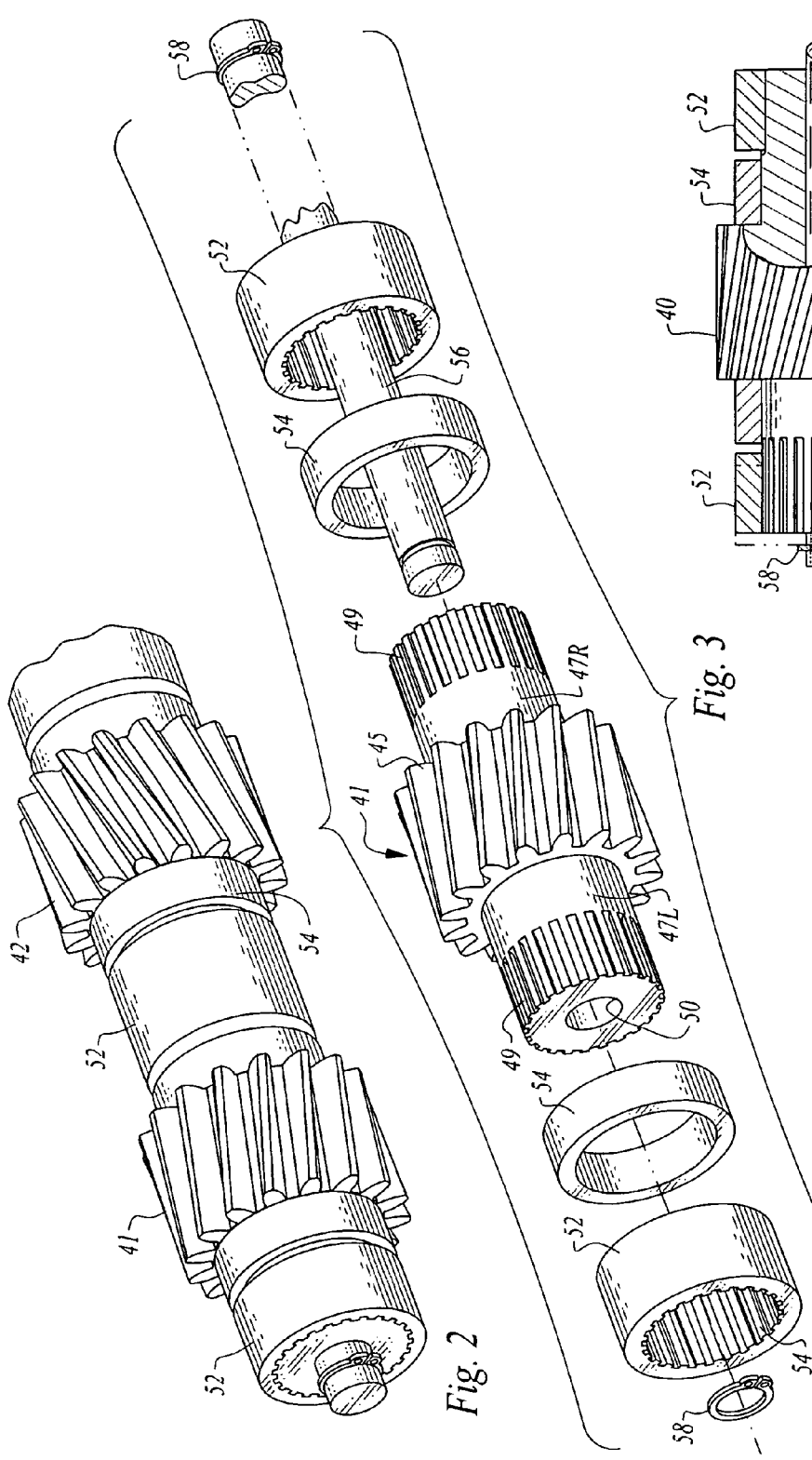
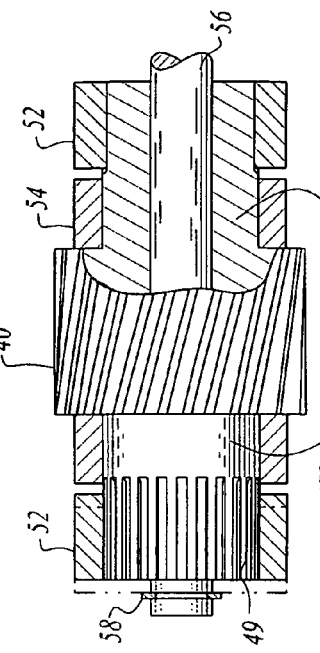
Fig. 2
Fig. 3
Fig. 4

HELICAL GEAR SETS

The present invention relates generally to transmission devices and, more particularly, to improvements in transmissions using helical gear sets for transmitting substantial loads in a relatively confined environment.

BACKGROUND OF THE INVENTION

1. Field of the Invention

Devices for transmitting power have existed in various forms since Leonardo DeVinci. The mechanical art has evolved from pegs in the circumference of a wheel to the present day sophisticated gearing sets.

As the environment in which a particular transmission must function changes, so too must the transmission provoke creative solutions. In the present instance, significant power is required to be transmitted through a restricted space, e.g., a drill or well casing, in which the interior diameter could be as little as 4 inches, and the working end of the drill string may be thousands of feet down from the power source.

It has been shown that transmission of power by gear sets in restricted spaces can be significantly increased by utilizing a configuration whereby multiple helical gears are arranged on a common spline shaft, as given in Morrow U.S. Pat. No. 5,297,147. As space becomes ever more restrictive and the gears, by necessity, decrease in size, the power capable of being transmitted by a gear set quickly becomes limited by the decreasing diameter of the common spline shaft. It is this problem which the present invention seeks to solve.

2. Overview of the Prior Art

Bruce Morrow, an acknowledged expert in the field, successfully addresses the issue of transmitting significant power via a novel gear train in a restricted space in his U.S. Pat. No. 5,927,147, in which retainers were disclosed. Morrow U.S. Pat. No. 6,334,368 [load sharing with planetary gearing]; U.S. Pat. No. 6,338,691 [a planetary system with helical gearing]; and U.S. Pat. No. 6,374,689 are examples of Morrow's work.

Hawkins U.S. Pat. No. 6,264,138 relates to a gear set for use in a turbo prop system for gas turbine engines, while Gotoh U.S. Pat. No. 6,666,103 discusses support for an intermediate shaft in a transmission, as does Jessup U.S. Pat. No. 4,641,543, where opposite and unequal helical angles are employed to balance loading.

The foregoing are merely indicative of the state of the art and in no way diminishes the novelty or value of the present invention.

SUMMARY OF THE INVENTION

It is important to understand the environment in which the present invention has particular, although not exclusive, utility in order to appreciate the novelty and value of the invention itself. While the gear set of the present invention is useable in a variety of settings, its principal utility lies in its capacity to transmit relatively great loads in very limited space, and the ability and capacity to accomplish that end is a particular objective of the invention.

It is a more particular objective of the present invention to provide a gear set which includes an array of helical gear pairs which are constrained against lateral movement to thereby maximize the power transmitted through the gear set. A further objective of the present invention, related to the foregoing, is to eliminate the the popular use of a spline shaft on which to mount the gears, yet still provide for axial movement of the gears, as well as inter gear load transmission.

Yet another objective of the present invention is to provide apparatus which permits the ready assembly of multiple helical pairs on a tension rail, which limits excessive lateral movement of the gears while still providing for enough lateral movement to maximize the power capable of being transmitted thereby.

Still another objective of the present invention is to achieve the objectives set froth above in a most economical manner.

The foregoing, as well as other objects and advantages of the invention, will become apparent to those skilled in the art when the following Detailed Description of a preferred Embodiment is read in conjunction with the drawings, wherein:

BRIEF DESCRIPTION OF THE DRAWINGS

FIG. 2 is a gear set assembly such as found in FIG. 1, illustrating the interrelationship of the various elements thereof;

FIG. 3 is an exploded view of the gear set assembly of FIG. 2, illustrating details of the various elements thereof; and, FIG. 4 a side elevation of a portion of a helical gear assembly, partially sectioned, to illustrate the interrelationship of a helical gear and the tension rail of the present invention.

DETAILED DESCRIPTION OF A PREFERRED EMBODIMENT

Figure 1:
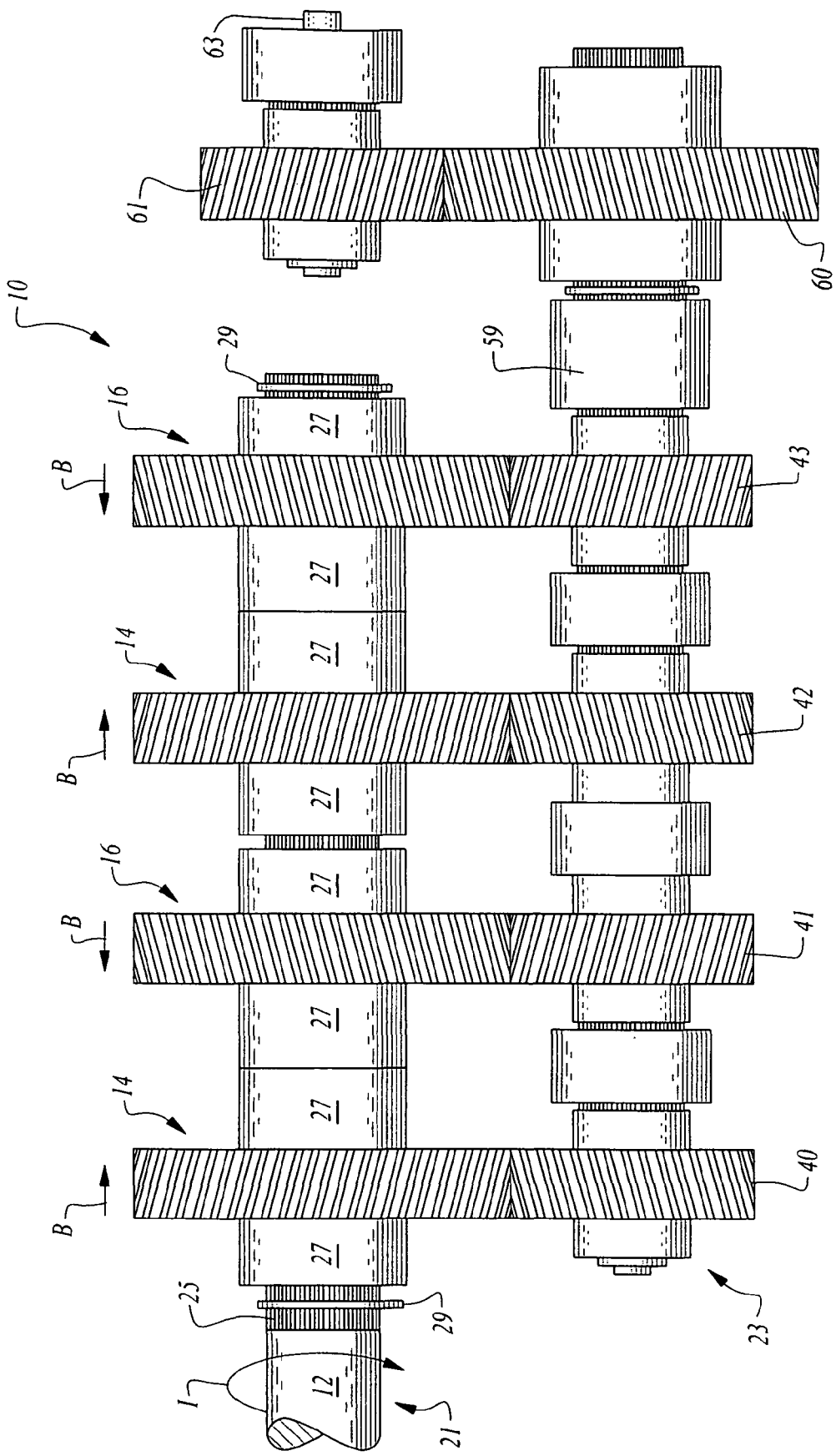
FIG. 1 is an exemplary helical gear set constructed in accordance with the present invention.

With reference now to the drawings, and initially to FIG. 1, a drive gear set assembly 10, constructed in accordance with the present invention, is shown. FIG. 1 has been specially devised to demonstrate and emphasize the difference and distinctions between the present state of the art in such gear sets and the advance in the art represented by the present invention.

The gear set assembly 10 is made up of a drive gear set 21 and a companion driven gear set 23. The drive gear assembly 21 includes an input drive shaft 12 which is connected to any one of several known power sources [not shown]. For demonstration purposes, the gear set is shown as being driven in a clockwise rotation, as illustrated by arrow "I".

The drive gear set 21 is representative of the present state of the art over which the present invention constitutes a significant advance. The drive gear set 21 comprises an array of helical gear elements 14 and 16, which are typical, with the helical gear elements 14 having a forward pitch, while the helical gear elements 16 have a rearward pitch. The drive gear set is mounted on the input drive shaft 12, the diameter of which is a limiting fact in the amount of power it is capable of delivering. The gear elements 14, 16 are internally splined so as to mesh with splines 25 formed on the external diameter of the input shaft.

Each gear element 14 and 16 includes a central section upon which helical gear teeth are, preferably, hobbed or otherwise formed on a blank, and the central section is flanked by bearing hubs 27, which may be internally splined in order to increase the driving contact between each gear and the drive shaft. Retainers, for example, snap rings 29, secure the gear sets on the drive shaft 12, it being understood that the helical configuration of the gear elements result in lateral movement of the elements as shown by directional arrows B, and retainers are required to hold them on the shaft. The hubs, in addition to adding strength by adding contact area, provide desirable spacing between and among the gearing which also provides bearing area.

With reference now to the driven gear set 23, a novel approach to the assembly and operation of a small but powerful transmission has been developed.

It will be remembered that the environment in which the present invention is particularly suited, namely in situations where space is severely limited and power requirements are high relative to the available space, is specially served by the present invention.

Now, referring specifically to the driven gear set of FIG. 1, the gear set 23 is, in this illustrated example, driven by the gear set 21. It will be appreciated by those skilled in the art that the structure of the gear set 21 is effective as either a drive or driven gear set.

The gear set 23 comprises an array of gear elements, in the illustrated case, four in number, although the precise number, even in number, may vary according to need, aligned on a single axis of rotation which is parallel to that of the drive gear set 21. Gear elements 40, 41, 42, and 43 are shown in alignment in FIG. 1. Referring to FIG. 3, an exploded view of a portion of the gear set 23 is shown.

With the exception of the pitch on the helical gears, each of the gear elements 40, 41, 42 and 43 have essentially the same structure. Referring to an exemplary gear element, such as gear element 41 of FIG. 3, at the center section 45 of the gear element is a series of helical gear teeth formed about the circumference of the central section of the gear element body. As in the case of the gear elements 14, 16, the center section 45 of each gear element is flanked by stub shafts 47, one of which, stub shaft 47L extends to the left and the other, 47R, extends to the right. These stub shafts 47R and L, may be integrally formed with, or otherwise rigidly connected to, the helical gear and form the bearing journals for each gear in the same way that bearing hubs 27 in FIG. 1 are the bearing journals for each gear element in gear set 21. Each stub shaft 47 is provided with a series of teeth defining a male spline at the remote end 49 of each. Each of the gears 40-43 are formed with a central bore 50, the significance of which will soon become apparent.

As seen in FIG. 2, the invention contemplates that a series of gear elements, such as gear elements 41 and 42, may be connected together, the precise number of which is to be determined by space and power limitations. In accomplishing this objective, couplers 52 are provided. The couplers have teeth 54 formed about the interior diameter thereof. The teeth formed in the coupler mate with and engage the teeth formed on the remote ends of the stub shafts 47L and 47R and are, thus, easily used to couple adjacent gear elements, e.g., gear elements 40, 41, 42 and 43, in power transmitting relation, to define a gear set 23. Adjacent pairs of gear elements have opposite pitch such that they converge toward one another.

Spacer bearing rings 54 are provided, having an inside diameter race 56 equal to the outside diameter of the stub shafts, and a length equal to the distance between the center section 45 of the gear and the teeth formed on the outboard end of each stub shaft. Accordingly, when a gear set 23 is assembled, the bearing rings secure the gear set in a casing [not shown] for rotation when power is applied to the drive shaft.

It is well known that helical gears, when rotated, impart a force vector to its companion gear, i.e. the gear with which it is engaged in driving relation, in a direction parallel to the axis of rotation of the gear. It is this lateral force via the consequent lateral movement of the gears that provides for the sharing of load among the gears on both the driving and driven gear sets (21 and 23, respectively) as described in Morrow U.S. Pat. No. 5,927,147, referenced above. As crucial as this lateral movement is, it must be limited to only the amount needed to affect load sharing, usually a small amount compared to the width of the gears themselves. In gear set 21, this lateral movement is limited by snap rings 29 fixed to the spline shaft 12. Note in FIG. 1 that the gears do not bear on the snap rings 29 due to the direction of rotation and helical angle of the gears assumed in the sample. If the rotation were reversed, the two outboard gears would move outward and bear on the snap rings 29. Were the snap rings not provided, the gears would continue to move outward until they either disengaged from the mating gear or encountered a component of the transmission that limited further movement. This is the nature of helical gears.

In keeping with the objectives of the invention to limit the lateral movement of the gears and in furtherance of this and other stated objectives, a tension rail 56 is provided. The tension rail 56, in the illustrated case, is an elongated rod having a diameter which is less than the central bore 50 in each of the gears in order to permit unrestricted rotation of the gears relative to the tension rail.

In assembly of a particular gear set, each of the gear elements 40-43 are serially slipped over the tension rail 56 with a bearing ring 54 in place on each stub shaft 47. A coupler 52 is positioned on adjacent stub shafts with a portion of the internal spline engaged in driving relation with the spline teeth at the remote end 49 thereof. As the next gear in line is mounted on the tension rail 56, its remote end of the stub shaft is aligned with the internal teeth formed in the coupler and inserted into the coupler, thereby engaging the gears in order that power transmitted to one is shared with others in the set. The length of the tension rail 56 is such that the remote ends thereof extend beyond the gear set and allow sufficient lateral movement of the gears to affect load sharing, as described in Morrow above, and preventing inadvertent disengagement therefrom.

Recognizing the tendency of the gear set to move laterally under load, retainers 58 are mounted at both ends to secure the gear set on the tension rail. It will be understood that while retainers, in the nature of snap rings, are illustrated, and located past or near the remote ends of the tension rail, the form of retainer capable of serving the purpose is within the contemplation of the invention.

Referring to the partial sectional view at FIG. 4, the relationship between the gear elements and the tension rail is shown. An exemplary gear element 41 is shown on a tension rail 56. A ring 54 is in place, as is a coupler 52, to complete the system. It will also be apparent from FIG. 4 that the effective diameter of the gear set is equal to the diameter of the stub shafts. As a consequence, the gear set 23 is capable of carrying a significantly greater load than that of the more conventional gear set 21, thereby accomplishing the major objective of the present invention.

FIG. 1 includes a connection by means of coupler 59 to the initial drive of a second stage and shows a driven gear 60, engaging a gear 61 to drive a shaft 63 to some undisclosed device, e.g., down hole pump or drill bit, to be driven through the transmission of FIG. 1. It will be appreciated that the diameter of the transmission relative to the power to be transmitted makes the transmission particularly suited to those applications where space is at a premium.

Having described a preferred embodiment of the invention in some considerable detail, some variation in the specific elements will occur to those skilled in the art. Such variations are deemed to be within the scope of the invention as defined by the claims, wherein:

The invention claimed is:

1. In a helical gear transmission capable of transmitting substantial power relative to its size; said transmission comprising at least two gear sets;
   at least one said gear set, comprising a string of gear elements, each said gear element including helical gear teeth formed about the circumference thereof;
   stub shafts on each said gear element positioned on opposite sides of said gear teeth and coaxial therewith;
   a central bore formed through each said gear element along the axis of rotation of said gear set; said central bore having a tension rail therein, wherein said tension rail permits unrestricted rotation of the gear elements relative to the tension rail.

2. The helical gear transmission of claim 1, wherein said gear set includes a series of couplers, each said coupler engaged between adjacent stub shafts in driving relation therewith such that rotation of one gear element results in the rotation of adjacent gear elements.

3. The helical gear transmission of claim 1, wherein each gear set includes an array of bearing rings, each said bearing ring being positioned on a said stub shaft so as to provide bearing support for said gear set.

4. The helical gear transmission of claim 1, wherein said tension rail extends beyond the full length of said gear set, and retainers on said tension rail, said retainers being affixed at remote ends of said tension rail, and being positioned to permit limited lateral movement on said tension rail, while holding said gear elements against inadvertent disengagement.

5. The helical gear transmission of claim 2, wherein each of said stub shafts are formed with male splines; said couplers having internal splines engaged with said male splines when said couplers are in position on adjacent stub shafts thereby effecting a unitary gear set rotatable in unison to transmit power thereby.

6. The helical gear transmission of claim 2, wherein each gear set includes an array of bearing rings, each said bearing ring being positioned on a stub shaft so as to provide bearing support for said gear set.

7. The helical gear transmission of claim 2, wherein said tension rail extends beyond the full length of said gear set, and retainers thereon, said retainers being affixed at remote ends of said tension rail, and being positioned to permit limited lateral movement on said tension rail, while holding said gear elements against inadvertent disengagement.

8. The helical gear transmission of claim 5, wherein each gear set includes an array of bearing rings, each said bearing ring being positioned on a said stub shaft so as to provide bearing support for said gear set.

9. A gear set comprised of a series of pairs of helical gears elements;
   each said gear element of said set comprising helical teeth formed about the circumference thereof; each gear element of a pair of which have a pitch that converges toward one another;
   stub shafts on each said gear positioned on opposite sides of said gear teeth and coaxial therewith;
   a central bore formed along the axis of said gear set, said central bore adapted to receive a tension rail therein wherein said tension rail permits unrestricted rotation of the gear elements relative to the tension rail; and a series of gear elements in a string mounted on said tension rail, said gears being interconnected in driving relation.

10. The gear set of claim 9, wherein each said gear set includes a series of couplers, each said coupler engaged between adjacent stub shafts in driving relation therewith such that rotation of one gear element results in the rotation of adjacent gear elements.

11. The gear set of claim 9, wherein each gear set includes an array of bearing rings, each said bearing ring being positioned on a stub shaft so as to provide bearing support for said gear set.

12. The gear set of claim 9, wherein said tension rail extends beyond the full length of each said gear set, and retainers on said tension rail, said retainers being affixed at remote ends of said tension rail, being positioned to permit limited lateral movement on said tension rail, while holding said gear elements against inadvertent disengagement.

13. The gear set of claim 9, wherein each of said stub shafts are formed with male splines; said couplers having internal splines engaged with said male splines when said couplers are in position on adjacent stub shafts thereby effecting a unitary gear set rotatable in unison to transmit power thereby.

14. The gear set of claim 10, wherein said tension rail extends beyond the full length of each said gear set, and retainers thereon, said retainers being affixed at remote ends of said tension rail, being positioned to permit limited lateral movement on said tension rail, while holding said gear elements against inadvertent disengagement.

15. The gear set of claim 11, wherein each of said stub shafts are formed with male splines; said couplers having internal splines engaged with said male splines when said couplers are in position on adjacent stub shafts thereby effecting a unitary gear set rotatable in unison to transmit power thereby.

* * * * *